(12) United States Patent
Wei

(10) Patent No.: US 12,270,437 B2
(45) Date of Patent: Apr. 8, 2025

(54) BEARING

(71) Applicant: TIEN HSIN INDUSTRIES CO., LTD., Taichung (TW)

(72) Inventor: Wei-Chih Wei, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 84 days.

(21) Appl. No.: 18/121,978

(22) Filed: Mar. 15, 2023

(65) Prior Publication Data

US 2024/0218906 A1 Jul. 4, 2024

(30) Foreign Application Priority Data

Dec. 28, 2022 (TW) .................................. 111150304

(51) Int. Cl.
*F16C 33/58* (2006.01)
*F16C 33/32* (2006.01)

(52) U.S. Cl.
CPC ............ *F16C 33/585* (2013.01); *F16C 33/32* (2013.01)

(58) Field of Classification Search
CPC ........ F16C 19/14; F16C 19/16; F16C 19/163; F16C 19/527; F16C 21/00; F16C 33/58; F16C 33/583; F16C 41/00; F16C 41/001; F16C 41/005; F16C 2326/26; B62K 21/06
See application file for complete search history.

(56) References Cited

U.S. PATENT DOCUMENTS

| | | | | |
|---|---|---|---|---|
| 3,013,296 | A * | 12/1961 | Lewin | G05G 5/26 16/338 |
| 7,452,135 | B1 * | 11/2008 | Holsaple | F16C 27/04 384/535 |
| 10,421,517 | B2 * | 9/2019 | Coaplen | B62K 19/32 |
| 2018/0043960 | A1 * | 2/2018 | Coaplen | B62K 21/06 |

FOREIGN PATENT DOCUMENTS

| | | | | |
|---|---|---|---|---|
| DE | 19645581 | A1 * | 8/1999 | ........... F03D 7/0204 |
| DE | 102008035717 | A1 * | 2/2010 | ............. F16C 17/12 |
| DE | 102018131102 | A1 * | 12/2019 | |

OTHER PUBLICATIONS

Machine Translation of DE-19645581-A1 (Year: 1999).*
Machine Translation of DE-102008035717-A1 (Year: 2010).*
Machine Translation of DE-102018131102-A1 (Year: 2019).*

* cited by examiner

*Primary Examiner* — Alan B Waits
(74) *Attorney, Agent, or Firm* — Apex Juris, pllc; R. Lynette Wylie

(57) ABSTRACT

A bearing includes a first ball track and a second ball track being annular and respectively disposed on an inside and an outside of the bearing. The first ball track has a first side wall and a second side wall. A first track and a first damping element are disposed on the first side wall. The second ball track has a third side wall and a fourth side wall. A second track and a second damping element are disposed on the third side wall. The first track and the second track jointly form a receiving space for disposing a plurality of balls abutted by both the first track and the second track. The second damping element and the first damping element get in contact and rub against each other to be rotatable relative to each other. The present disclosure provides a damping for rotating through rubbing between the damping elements.

10 Claims, 7 Drawing Sheets

BEARING

BACKGROUND OF THE INVENTION

Technical Field

The present disclosure relates generally to a mechanical component, and more particularly to a bearing structure providing damping.

Description of Related Art

In a conventional bearing used in a headset bearing of a bicycle, a plurality of balls is disposed between an inner ring and an outer ring and makes the inner ring and the outer ring rotate relative to each other in a sliding way, thereby both a fork engaged with the headset and a stem disposed on a top end of the fork could smoothly turn along a clockwise direction or along an anticlockwise direction.

Although the conventional bearing of the headset could guide the fork to smoothly turn, when such type of freely rotatable headset is applied to certain bicycle types, e.g. a bicycle type having a basket disposed on the stem, so that the bicycle easily encounters an additional external turning force during starting or turning of the bicycle due to a load on the stem, and such external turning force suddenly generated easily causes the fork to oversteer instantaneously, thereby causing accidents of turning over during riding the bicycle as the stem excessively deviates from a suitable position.

BRIEF SUMMARY OF THE INVENTION

In view of the above, the primary objective of the present disclosure is to provide a bearing, wherein a plurality of balls makes an inner ball track and an outer ball track rotate relative to each other in a sliding way and two damping elements respectively connected to the inner ball track and the outer ball track provide a resistance for rotating through contacting and rubbing against each other, thereby reducing a speed of relative rotation of the inner ball track and the outer ball track upon experiencing a force.

The present disclosure provides a bearing, including a first ball track, a second ball track, and a plurality of balls. The first ball track is annular and has a first side wall and a second side wall, wherein a first track and a first damping element are disposed on the first side wall. The second ball track is annular and has a third side wall and a fourth side wall, wherein a second track and a second damping element are disposed on the third side wall. The third side wall faces the first side wall to make the first track and the second track jointly form a receiving space. The second damping element and the first damping element get in contact and rub against each other to be rotatable relative to each other. The plurality of balls is disposed in the receiving space and are abutted by both the first track and the second track.

With the aforementioned design, the balls are disposed in the receiving space and are abutted by the first track and the second track to allow the first ball track and the second ball track to smoothly rotate relative to each other, and the first damping element and the second damping element get in contact and rub against each other to provide the resistance for the relative rotation of the first ball track and the second ball track. In this way, the rapid relative rotation of the inner ball track and the outer ball track could be avoided upon experiencing a sudden external force, so that when the bearing is used as a headset bearing, accidents due to unsuitable oversteering of the fork during riding the bicycle could be avoided.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
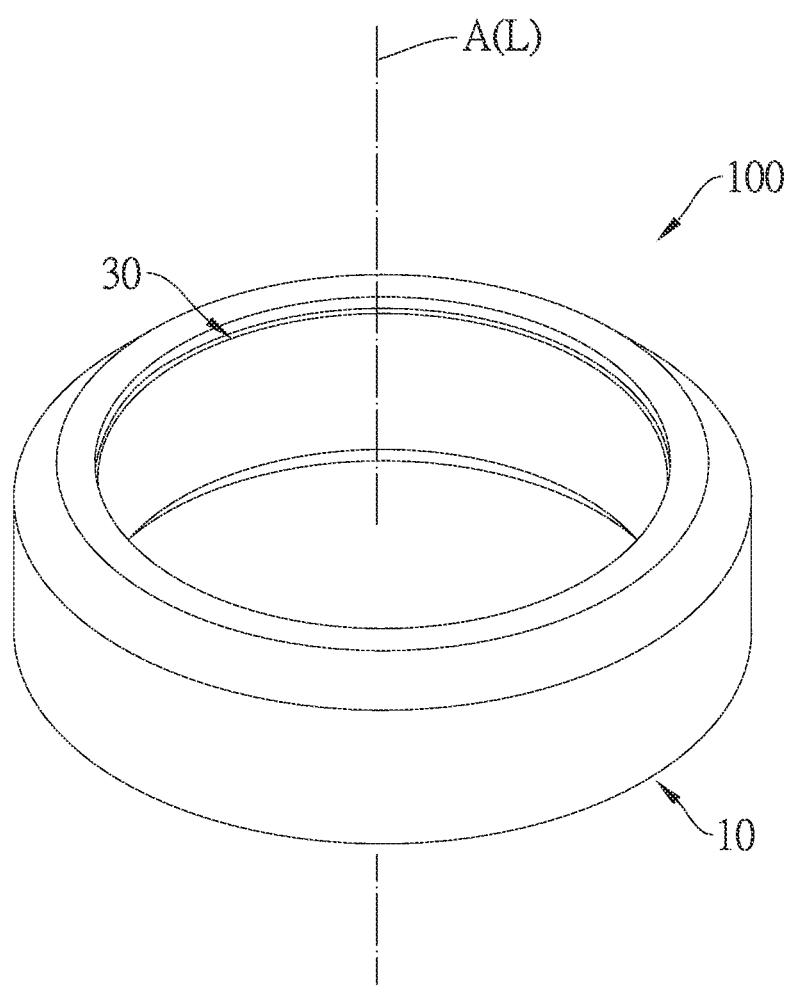
FIG. 1 is a perspective view of the bearing according to an embodiment of the present disclosure.
Figure 2:
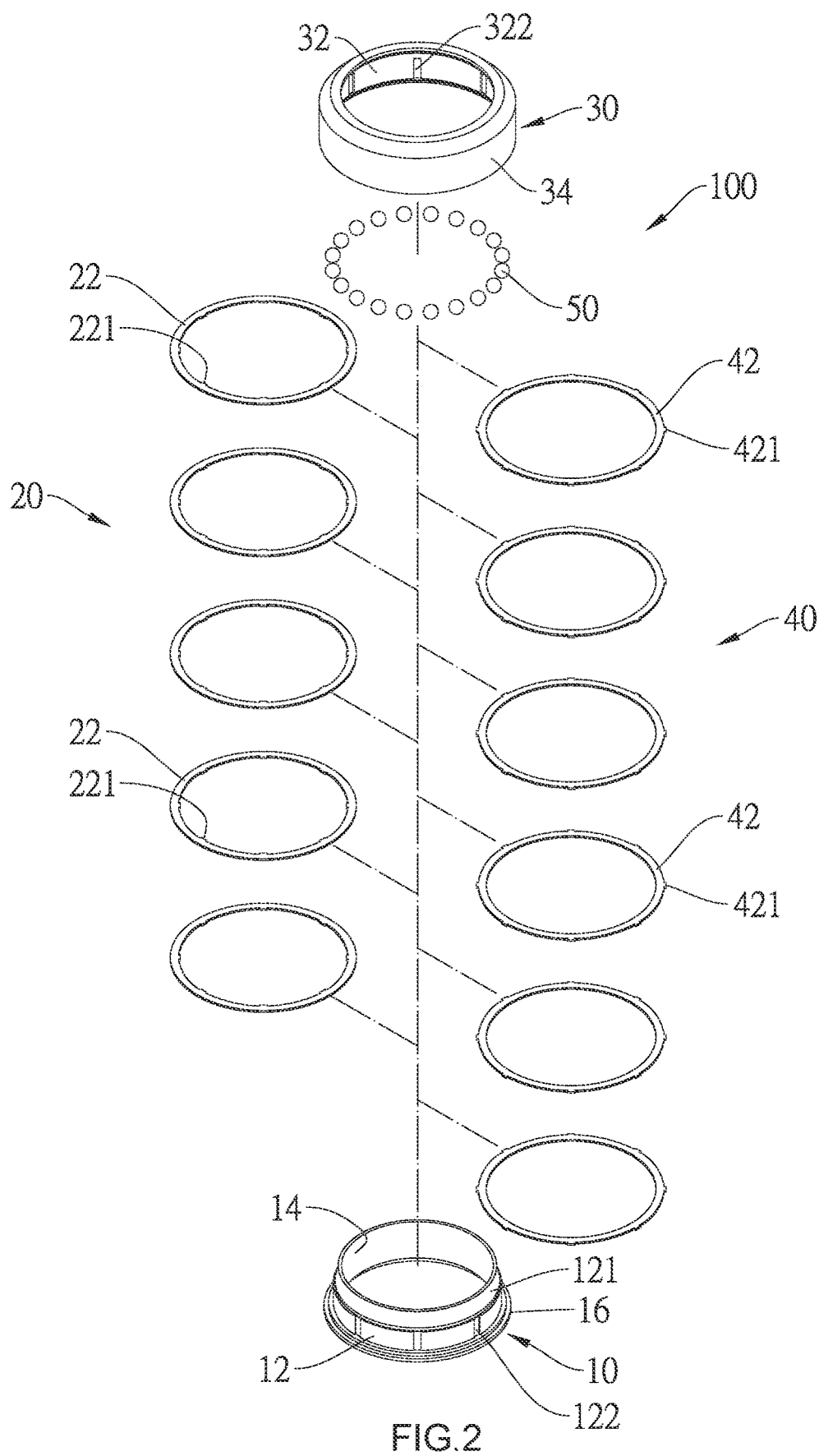
FIG. 2 is an exploded view of FIG. 1.
Figure 3:
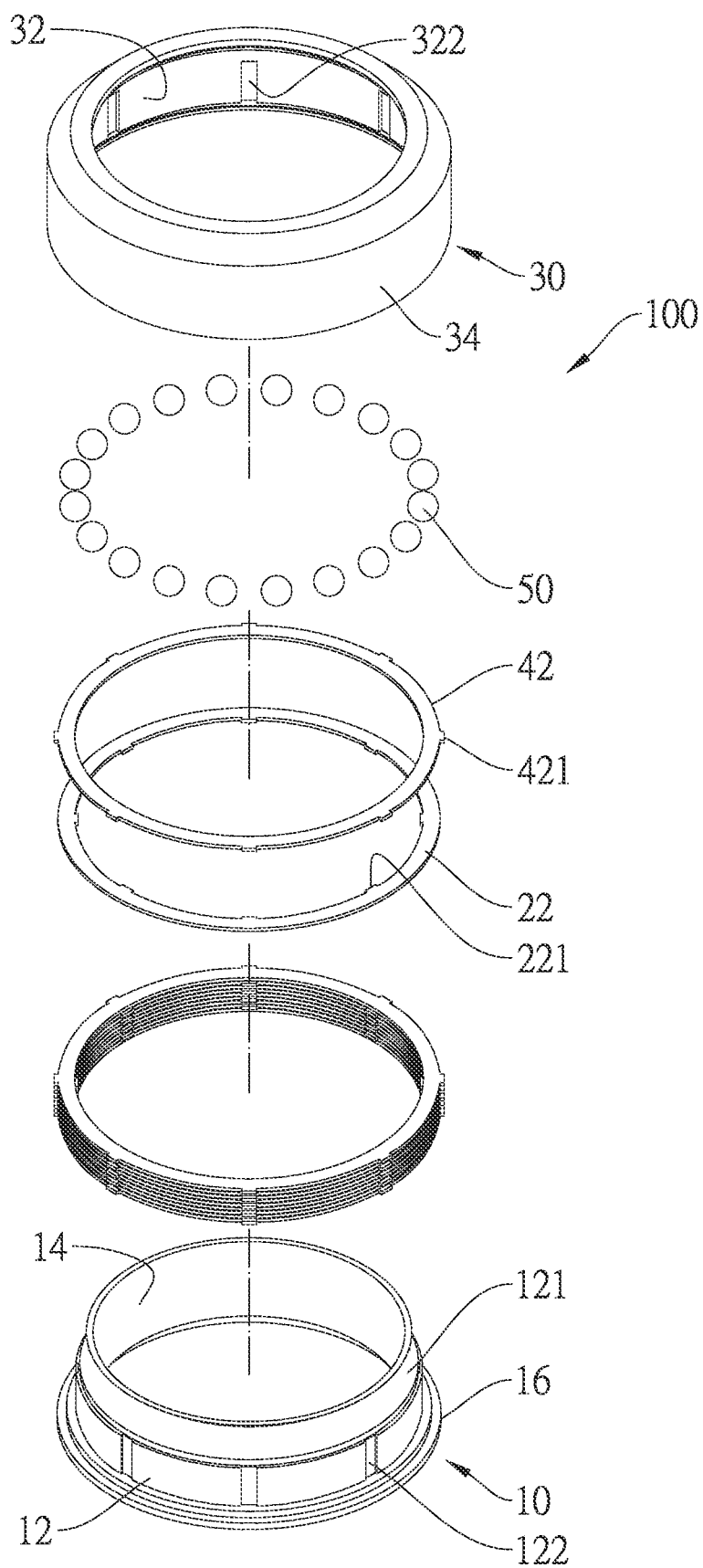
FIG. 3 is a partially exploded view of FIG. 1.
Figure 4:
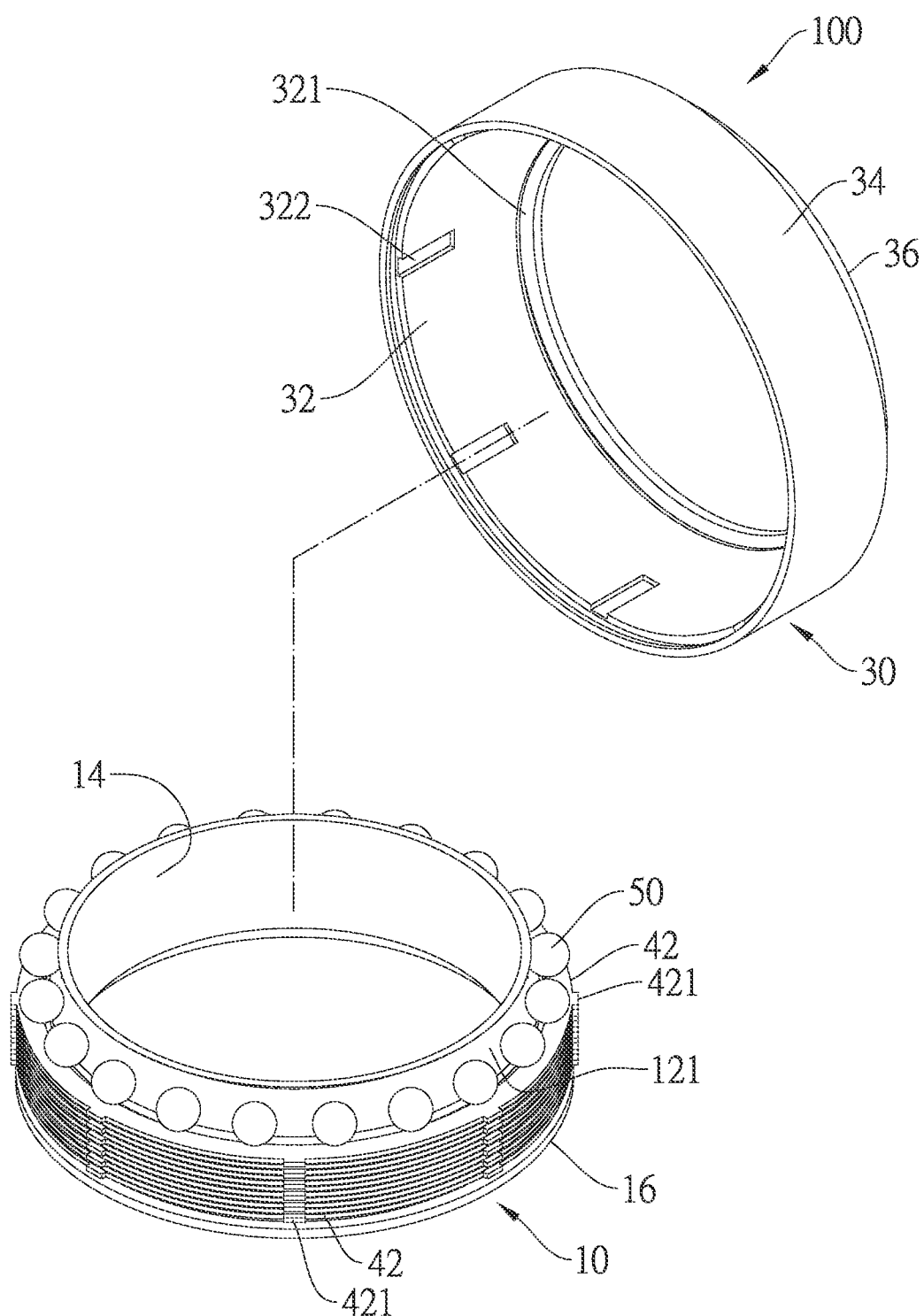
FIG. 4 is another partially exploded view of FIG. 1, showing the second ball track being separated.
Figure 5:
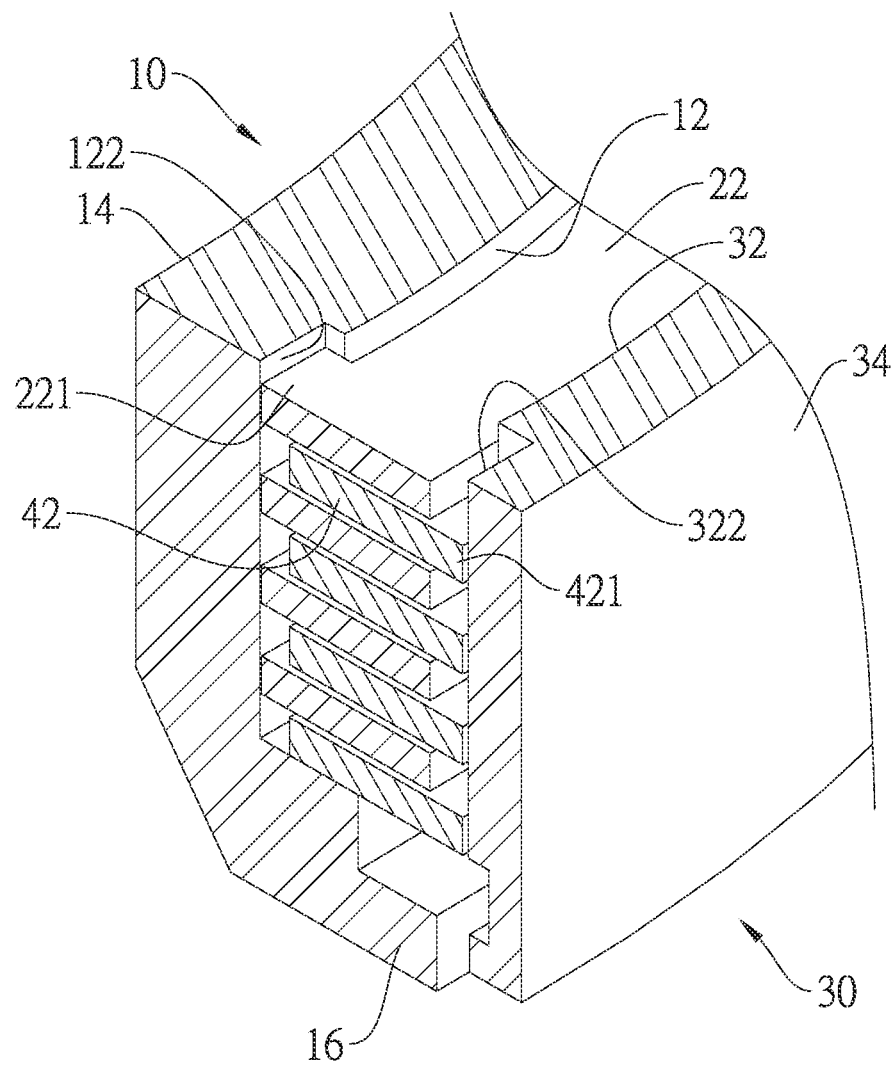
FIG. 5 is an enlarged and sectional schematic view of a part of the bearing shown in FIG. 1.

A bearing 100 according to an embodiment of the present disclosure is illustrated in FIG. 1 to FIG. 5, has a central axis A extending along a first direction L, and includes a first ball track 10, a first damping element 20, a second ball track 30, a second damping element 40, and a plurality of balls 50.

The first ball track 10 is an annular ring, wherein a part of an outer periphery has a first side wall 12 and a part of an inner periphery of the first ball track 10 has a second side wall 14. A first track 121 and the first damping element 20 are disposed on the first side wall 12. The second ball track 30 is an annular ring, wherein a part of an inner periphery has a third side wall 32 and a part of an outer periphery of the second ball track 30 has a fourth side wall 34. A second track 321 and the second damping element 40 are disposed on the third side wall 32.

Figure 6:
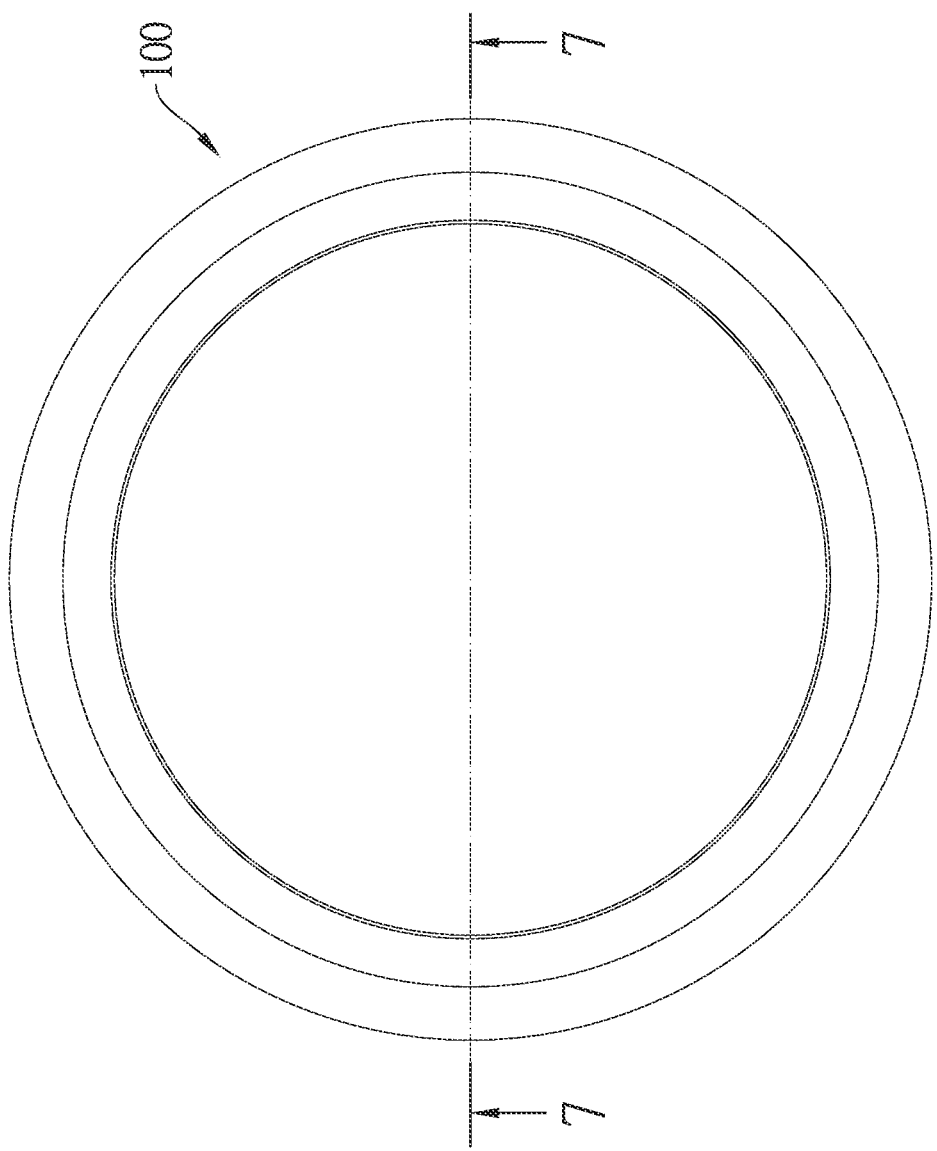
FIG. 6 is a top view of the bearing according to the embodiment of the present disclosure.
Figure 7:
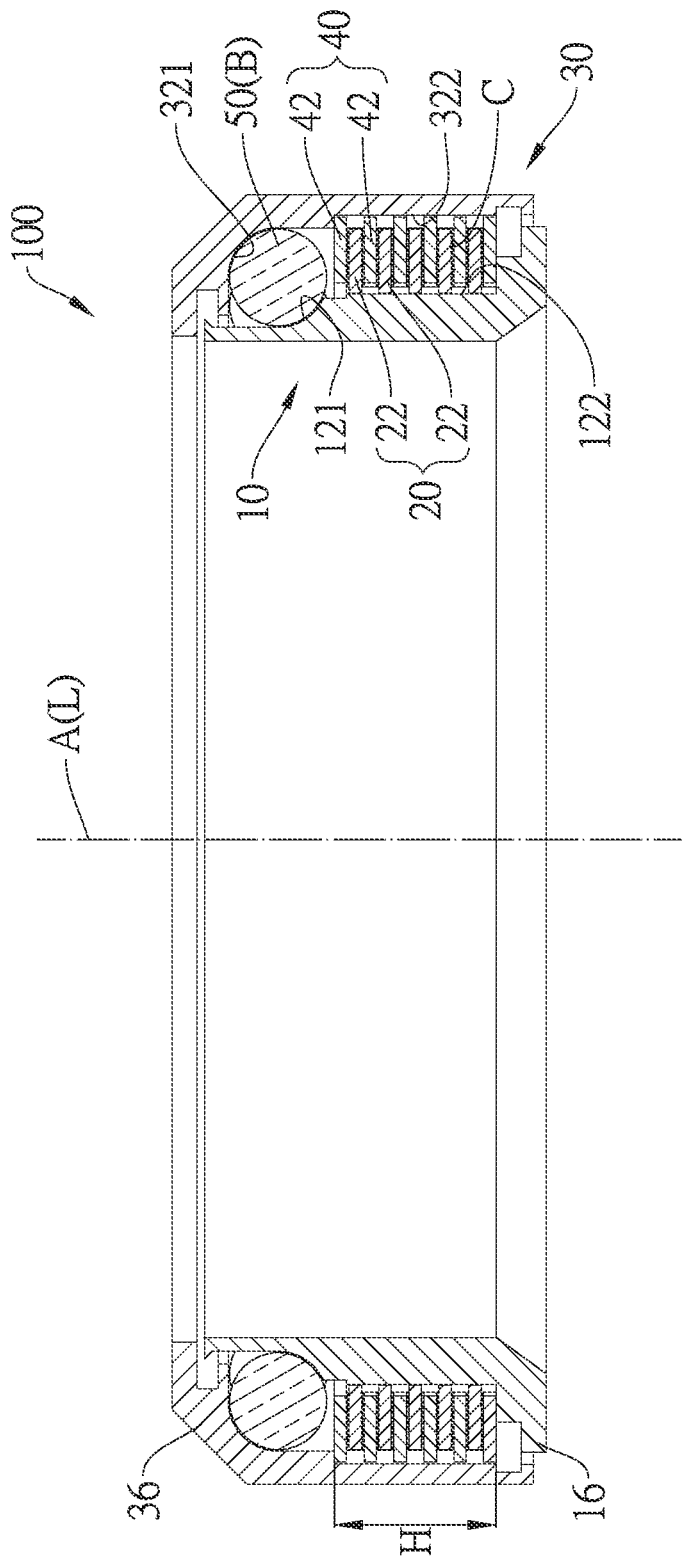
FIG. 7 is a sectional view along the 7-7 line of FIG. 6.

Referring to FIG. 6 and FIG. 7, in the current embodiment, the first ball track 10 and the second ball track 30 are respectively disposed on an inside and an outside of the bearing 100, wherein the third side wall 32 faces the first side wall 12 to make the first track 121 and the second track 321 jointly form a receiving space B. The balls 50 are disposed in the receiving space B, are abutted by both the first track 121 and the second track 321, and roll around the central axis A. In other embodiments, the balls 50 could be changed to needle rollers or other rolling elements depending on different bearing types. The second damping element 40 and the first damping element 20 get in contact and rub against each other to be rotatable relative to each other. More specifically, the first damping element 20 and the second damping element 40 are arranged along the first direction L that the central axis A extends along, so that when the first damping element 20 and the second damping element 40 respectively rotate along with the first ball track 10 and the second ball track 30, a part of the first damping element 20 and a part of the second damping element 40 adjacent to each other in the first direction L get in contact and rub against each other to be rotatable relative to each other, thereby could provide a resistance to a relative rotation of the first ball track 10 and the second ball track 30, reducing a speed of the relative rotation of the first ball track 10 and the second ball track 30 and avoiding a rotating speed of the first ball track 10 and the second ball track 30 from being too large upon experiencing an external force.

As shown in FIG. 2 and FIG. 4 to FIG. 7, the first damping element 20 includes a plurality of first friction plates 22 connected to the first side wall 12. The second damping element 40 includes a plurality of second friction plates 42 connected to the third side wall 32. The first friction plates 22 and the second friction plates 42 are alternately arranged along the first direction L, wherein each of the first friction plates 22 and adjacent one of the second friction plates 42 rub against each other to be rotatable relative to each other.

When the bearing 100 is used as a headset bearing, a total height H of the first friction plates 22 and the second friction plates 42 in the first direction L is less than or equal to 20 mm, i.e., the total height H of the first damping element 20 and the second damping element 40 in the first direction L is less than or equal to 20 mm. In the current embodiment, the total height H of the first damping element 20 and the second damping element 40 in the first direction L is about 12 mm. In other embodiments, the total height H of the first damping element 20 and the second damping element 40 in the first direction L could be less than 12 mm. In order to facilitate both the first damping element 20 and the second damping element 40 to slide upon rubbing against each other and provide a certain friction, a damping fluid C is disposed between the first damping element 20 and the second damping element 40 and could be a grease or a damping grease having a certain viscosity.

In the current embodiment, the first damping element 20 is connected to the first ball track 10 through a plurality of first fitting grooves 122 extending along the first direction L, formed on the first side wall 12, and arranged around the first side wall 12, wherein an end of each of the first fitting grooves 122 in the first direction L communicates with the first track 121. A peripheral edge of the first side wall 12 corresponding to another end of each of the first fitting grooves 122 in the first direction L is connected to a first flange 16, wherein the another end of each of the first fitting grooves 122 ends at the first flange 16. Each of the first friction plates 22 is annular, wherein an inner peripheral edge of each of the first friction plates 22 has a plurality of first fitting portions 221 extending along a radial direction of the corresponding first friction plate 22 and corresponding to one of the first fitting grooves 122. Each of the first fitting portions 221 fits in one of the first fitting grooves 122.

The second damping element 40 is connected to the second ball track 30 through a plurality of second fitting grooves 322 extending along the first direction L, formed on the third side wall 32, and arranged around the third side wall 32. An opening of an end of each of the second fitting grooves 322 in the first direction L is blocked by the first flange 16 and another end of each of the second fitting grooves 322 in the first direction L is a closed end. Each of the second friction plates 42 is annular, wherein an outer peripheral edge of each of the second friction plates 42 has a plurality of second fitting portions 421 extending along a radial direction of the second friction plates 42 corresponding to one of the second fitting grooves 322. Each of the second fitting portions 421 fits in one of the second fitting grooves 322. A side of the third side wall 32 adjacent to the second track 321 and away from the second fitting grooves 322 is connected to a second flange 36. The second flange 36 and the first flange 16 are opposite to each other and are respectively located on two opposite sides in the first direction L. The first damping element 20, the second damping element 40, and the balls 50 are received between the first flange 16 and the second flange 36.

In an embodiment, only a part of the first friction plates 22 (e.g. one or plural first friction plates 22) fits in the first fitting grooves 122 via the first fitting portions 221 of the corresponding first friction plate 22, while another part of the first friction plates 22 is connected to the first side wall 12 through an undetachable way (e.g. welding, adhering, etc.) or a detachable way (e.g. screwing, being stuck, etc.). Similarly, only a part of the second friction plates 42 (e.g. one or plural second friction plates 42) fits in the second fitting grooves 322 via the second fitting portions 421 of the corresponding second friction plate 42, while another part of the second friction plates 42 is connected to third side wall 32 through an undetachable way (e.g. welding, adhering, etc.) or a detachable way (e.g. screwing, being stuck, etc.). With the aforementioned structure, at least one of the first friction plates 22 fits in the first side wall 12 and at least one of the second friction plates 42 fits in the third side wall 32.

In the aforementioned embodiment, a part of the first damping element 20 is connected to the first side wall 12 of the first ball track 10 in a detachable way and another part of the first damping element 20 is connected to the first side wall 12 of the first ball track 10 in an undetachable way; a part of the second damping element 40 is connected to the second ball track 30 in a detachable way and another part of the second damping element 40 is connected to the second ball track 30 in an undetachable way. However, in other embodiments, the first damping element 20 could be fixedly disposed on the first side wall 12 of the first ball track 10 in an undetachable way, and the second damping element 40 could be fixedly disposed on the third side wall 32 of the second ball track 30 in an undetachable way.

In the embodiment shown in FIG. 1, the first damping element 20 and the second damping element 40 are respectively made of different materials. In other embodiments, when the first damping element 20 is undetachably connected to the first side wall 12 of the first ball track 10, the first damping element 20 is made of a material the same as that of the first ball track 10; when the second damping element 40 is undetachably connected to the second ball track 30, the second damping element 40 is made of a material the same as that of the second ball track 30, thereby either the first damping element 20 or the second damping element 40 is made of the material the same as that of the first ball track 10 and/or the second ball track 30, thus to reduce the possibility of causing electrochemical corrosion, and to prevent the deformation caused from the difference between a hardness of the first damping element 20 and a hardness of the first ball track 10 and/or a hardness of the second ball track 30 or the difference between the hardness of the second damping element 40 and the hardness of the first ball track 10 and/or the hardness of the second ball track 30. The first damping element 20 and the second damping element 40 could be made of the same material selected from stainless steel, aluminum alloy, titanium alloy, plastic, composite material, a combination thereof, or could be respectively made of any two different materials selected therefrom.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A bearing, comprising:
  a first ball track being annular and having a first side wall and a second side wall, wherein a first track and a first damping element are disposed on the first side wall;

a second ball track being annular and having a third side wall and a fourth side wall, wherein a second track and a second damping element are disposed on the third side wall; the third side wall faces the first side wall to make the first track and the second track jointly form a receiving space; the second damping element and the first damping element get in contact and rub against each other to be rotatable relative to each other; and a plurality of balls disposed in the receiving space and abutted by both the first track and the second track;

wherein the first damping element and the second damping element are made of different materials;

wherein either the first damping element or the second damping element is made of a material the same as a material of the first ball track and a material of the second ball track.

2. The bearing as claimed in claim 1, wherein the plurality of balls rolls around a central axis extending along a first direction, and the first damping element and the second damping element are arranged along the first direction.

3. The bearing as claimed in claim 2, wherein the first damping element comprises a plurality of first friction plates connected to the first side wall; the second damping element comprises a plurality of second friction plates connected to the third side wall; the plurality of first friction plates and the plurality of second friction plates are alternately arranged, wherein each of the plurality of first friction plates and adjacent one of the plurality of second friction plates rub against each other to be rotatable relative to each other.

4. The bearing as claimed in claim 1, wherein a damping fluid is disposed between the first damping element and the second damping element.

5. The bearing as claimed in claim 3, wherein at least one of the plurality of first friction plates fits in the first side wall and at least one of the plurality of second friction plates fits in the third side wall.

6. The bearing as claimed in claim 5, wherein the first side wall has a plurality of first fitting grooves extending along the first direction; the at least one of the plurality of first friction plates is annular, wherein an inner peripheral edge of the at least one of the plurality of first friction plates has a plurality of first fitting portions extending along a radial direction of the corresponding first friction plate and corresponding to one of the plurality of first fitting grooves; each of the plurality of first fitting portions fits in one of the plurality of first fitting grooves; the third side wall has a plurality of second fitting grooves extending along the first direction; the at least one of the plurality of second friction plates is annular, wherein an outer peripheral edge of the at least one of the plurality of second friction plates has a plurality of second fitting portions extending along a radial direction of the corresponding second friction plate and corresponding to one of the plurality of second fitting grooves; each of the plurality of second fitting portions fits in one of the plurality of second fitting grooves.

7. The bearing as claimed in claim 6, wherein a total height of the first damping element and the second damping element in the first direction is less than or equal to 20 mm.

8. The bearing as claimed in claim 7, wherein the total height of the first damping element and the second damping element in the first direction is less than or equal to 12 mm.

9. The bearing as claimed in claim 1, wherein the first damping element is disposed on the first side wall in an undetachable way, and the second damping element is disposed on the third side wall in an undetachable way.

10. The bearing as claimed in claim 1, wherein a material of the first damping element is stainless steel, aluminum alloy, titanium alloy, plastic, or composite material; a material of the second damping element is stainless steel, aluminum alloy, titanium alloy, plastic, or composite material.

* * * * *